Feb. 18, 1936.                B. HOPPER                    2,031,107
          PROCESS FOR SEPARATING OIL FROM WAX CAKES
                    Filed May 28, 1934        2 Sheets-Sheet 1
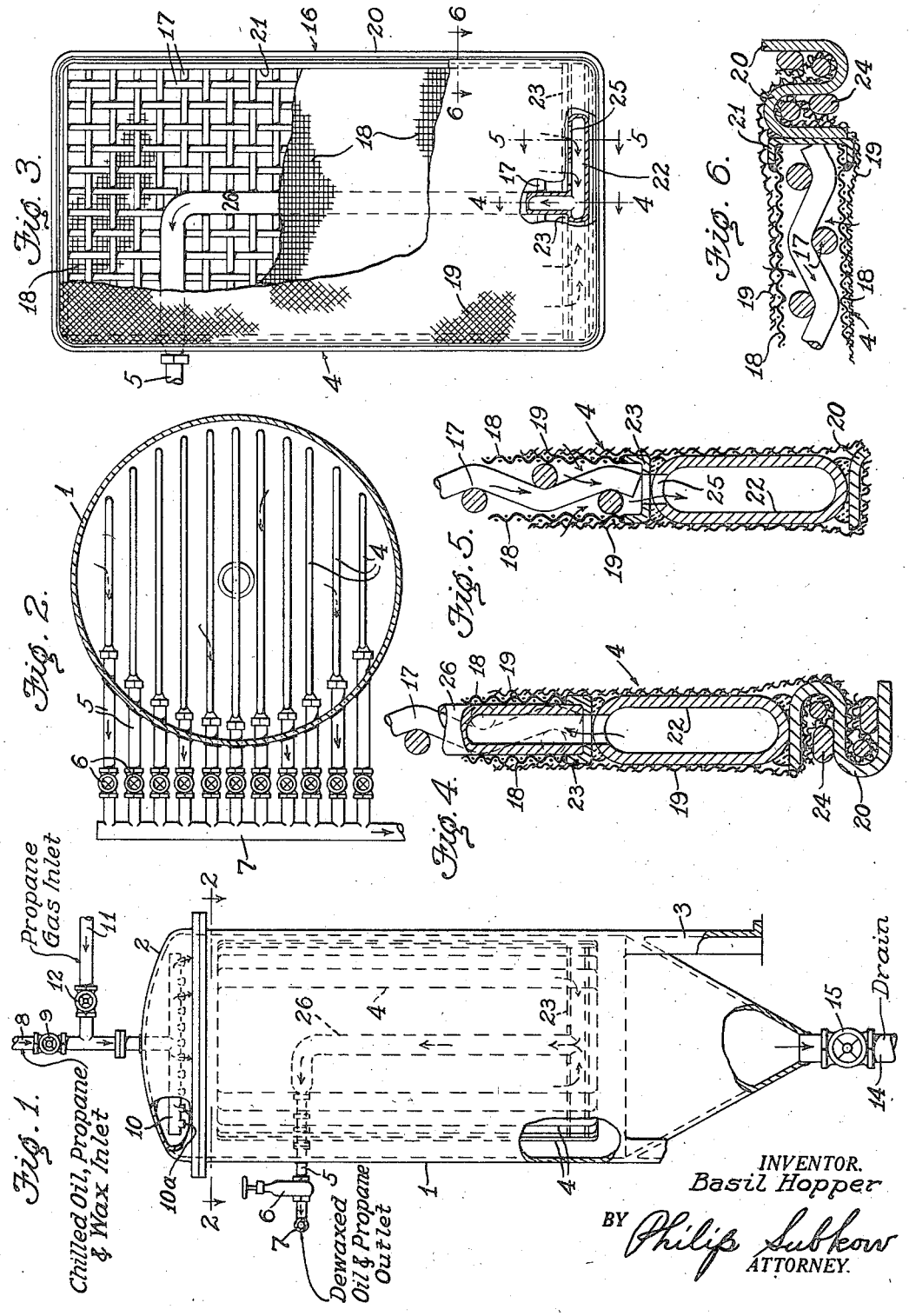
INVENTOR.
Basil Hopper
BY Philip Subkow
ATTORNEY.

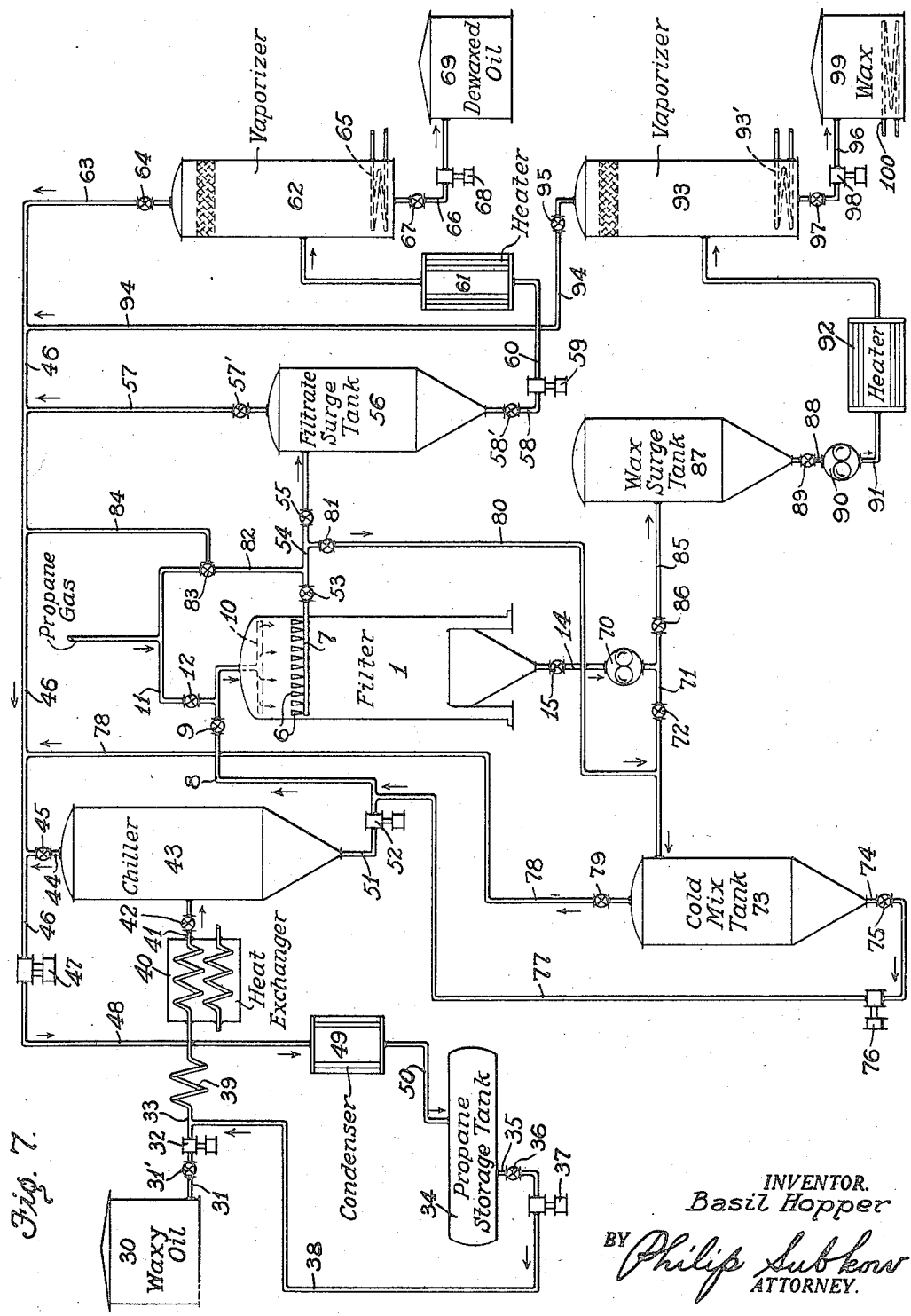

Patented Feb. 18, 1936

2,031,107

UNITED STATES PATENT OFFICE 2,031,107

PROCESS FOR SEPARATING OIL FROM WAX CAKES

Basil Hopper, San Pedro, Calif., assignor to Union Oil Company of California, Los Angeles, Calif., a corporation of California Application May 28, 1934, Serial No. 727,841

11 Claims. (Cl. 196—20)

The present invention relates to a process for separating wax from oil. More specifically, it relates to a process for recovering oil and solvent entrained in wax cakes. This invention is a continuation in part of my copending application, Serial No. 718,609 filed April 2, 1934 which relates to apparatus for carrying out my invention.

In recent years, processes have been developed for separating wax from oils wherein the wax-containing oil is first diluted with a solvent of low specific gravity in order to reduce the viscosity of the waxy oil and to permit wax crystallized by chilling to be more readily separated from the solvent and oil. The solution of waxy oil and solvent is then chilled to a low temperature in order to permit the wax to precipitate from solution. The chilled mixture of oil, solvent and precipitated wax is then passed through a filter in which the precipitated wax is separated from the oil and solvent or the precipitated wax may be separated by cold settling or centrifuging. The solvent is then removed from the dewaxed oil by distillation. In more recent years, oils have been dewaxed by dissolving them in a light liquid hydrocarbon, preferably a normally gaseous diluent such as liquid propane and the chilling has been accomplished by vaporizing a portion of the solvent under reduced pressure. By employing propane under pressure as the diluent and refrigerant, temperatures of approximately −40° F. may be obtained by gradually releasing the pressure to effect vaporization of a portion of the propane. At such temperatures substantially all of the wax will precipitate from solution. The chilled mixture is then passed through a filtering unit containing a plurality of filter leaves wherein the oil and solvent is forced through the filter leaves into a central chamber from which it is withdrawn while the wax accumulates as a wax cake upon the outer cloth of the filter leaves. When a sufficient quantity of wax has accumulated upon the filter leaves, the filtration of further quantities of oil is discontinued and the filter chamber is then drained of the propane-lubricating oil mix.

It has been known to then place from 10 to 20 lbs. per square inch propane pressure on the filter shell and blow propane-gas through the leaves to recover the propane-oil mixture with which the wax cake is wet. In other words, the filtration of the mixture of oil, propane and precipitated wax does not result in a complete separation of oil and propane from the wax. A substantial amount of propane and oil will be contained in the wax cakes adhered to the filter leaves. Consequently, by blowing propane-gas through the wax cake, a portion of the absorbed oil and propane will be separated from the wax cake. The present invention relates to an improvement in this blowing procedure to separate entrained oil and propane in the wax cake.

I have discovered that more effective results, i. e. better and more complete separation of the oil and propane from the wax cakes may be obtained if the blowing procedure is accompanied with a partial washing of the wax cakes. The pressures heretofore employed for blowing propane gas through the wax cakes have been insufficient to obtain a partial washing with liquid propane of the wax cakes.

I have discovered that if the blowing with the propane gas is started at the low pressures normally used, i. e. 10 to 20 lbs. per square inch and continued for several minutes and then the pressure in the filtering chamber gradually increased to values of 50 to 100 lbs. per square inch and continued for a length of time necessary to give the maximum degree of washing which usually requires from 10 to 15 minutes that improved results may be obtained. By operating in this manner, I have reduced the oil content in the recovered wax cake approximately 50 to 75%. By operating according to the known processes, the wax cake will contain approximately 50% oil. I have reduced this oil content to 15 to 25% which represents a substantial improvement over the former process. When placing the high propane-gas pressure in the filtering shell, liquid propane condenses on the wax cake due to the high pressure of the propane coming in contact with the low temperature wax cake and the propane not only gives the blowing effect normally obtained but also a partial washing of the wax cake. With the lower blowing pressure heretofore mentioned, insufficient propane is condensed to give appreciable washing. On the other hand, it is quite necessary to start the blowing at the low pressures and then gradually raise the pressure to the higher values in order to obtain both the blowing and the washing effect without appreciable sloughing off of the wax cake from the filter leaves. If the blowing is started at the high pressure, sufficient propane is condensed on the wax cake to slough off or wash the wax cake from the filter leaves and as a result no washing or blowing effect can be obtained, whereas if the low pressure blowing is first carried out, the cake will be partially dried so that when the higher pressure operations are resorted to with a resulting liquid washing of the wax cake, the higher pressure operation will not slough off appreciable quantities of wax from the filter leaves.

It is, therefore, an object of my invention to provide a process for separating oil and solvent from wax cakes containing the same.

Another object of the invention resides in separating oil and solvent from wax cakes by blowing a condensable gas through said wax cakes under such conditions as to obtain a partial drying of the wax cakes followed by partial washing of the wax cakes without sloughing off appreciable quantities of wax from the wax cake adhered to the filter leaves.

A further object of the invention resides in blowing the wax cakes containing oil and solvent with a hydrocarbon gas at low pressures to partially dry the wax cakes and then gradually increasing the pressure to higher pressure levels to effect condensation of a portion of the hydrocarbon gas on the wax cakes and a partial washing thereof.

Another object of the invention is to dispose spray nozzles for introducing the chilled mixture of oil, propane and precipitated wax over the filter leaves in such manner that wax accumulating between filter leaves which does not drop to the bottom of the filter shell by flapping of the filtering elements will be washed to the bottom of the filter shell such as when the filtration cycle is resumed.

Various other objects and features of my invention will be apparent to those skilled in the art by the following description of the invention taken from the drawings in which:

Fig. 1 represents an elevation of the wax separating filter.

Fig. 2 is a cross-sectional plan of the filter taken through lines 2—2 of Fig. 1 and showing a plurality of filter leaves connected to the oil and solvent discharge pipes which are connected to a manifold.

Fig. 3 represents an elevation of a filter leaf with parts broken away to show two screens, a filter element and the oil and solvent discharge pipe.

Figs. 4, 5 and 6 are sections of a part of the filter leaf taken respectively on lines 4—4, 5—5, 6—6 of Fig. 3.

Fig. 7 represents a flow diagram of arrangement of apparatus adapted to carry out my invention.

Before describing the method for separating wax from oil and for separating the oil and solvent from the filter cakes, it is preferable to obtain an idea of the structure of the filter as shown in the drawings. The filtering unit comprises a vertical cylindrical filter tank or shell 1 which is provided with a tightly fitted removable cover 2 and skirts 3 for supporting the tank. Suspended in the body of the vertical cylindrical shell are a plurality of filter leaves 4. Each filter leaf is connected to an outlet 5 provided with a valve 6 and each of the outlets are connected to a discharge manifold 7. Valves 6 are for the purpose of cutting out any of the discharge lines 5. The filter shell is provided at the top with line 8 and valve 9 which connects to a spray head or spider 10 disposed over the filter leaves and which is provided with a plurality of openings 10a. The spider 10 is preferably disposed over the filter leaves so that openings 10a are positioned between filter leaves so that a spray of material may fall between the filtering elements for the purpose hereinafter described. Spray head 10 is employed for introducing the mixture of chilled oil, solvent and precipitated wax. Line 11 controlled by valve 12 is for the purpose of introducing a condensable gas into the filter shell as will hereinafter be described. The lower portion of the filter shell is preferably conical and is provided with a drain 14 controlled by valve 15.

Referring to Fig. 3, the filter leaf may consist of a peripheral frame 16 secured to a coarse screen 17 which holds the filter elements apart and permits the filtrate to drain into a receiver as will be hereinafter described. On each side of the coarse screen 17 are provided finer metal screens 18 which are provided for supporting filter elements 19 on the outer sides of the finer screens. The filter elements are usually of canvas cloth but may be of other suitable material. The peripheral frame 16 is preferably build up of a bar of S-shaped cross-section 20 which is welded to the channel bar 21 on all sides except at the bottom in which case it is welded to filtrate collector 22. The filtrate collector is preferably welded on its upper end to a channel bar 23. The coarse screen 17 is welded to the channel bars 21 and 23. The finer screen 18 is also welded to the channel bars. The filter element 19 is secured to the filter leaf by disposing the ends in the grooves of the S-bar and weaving therein sash cord or cotton rope 24 as shown in Figs. 4 and 6.

At the base of the filter leaf a filtrate collector pipe 22 is provided which comprises a flattened pipe and which receives the filtrate through openings 25. The filtrate collector is connected to a communicating vertical discharge pipe 26 which is secured to the coarse screen and which connects with a discharge pipe 5 and manifold 7.

Referring to Fig. 7 a wax-containing oil such as an S. A. E. 20 or 50 waxy distillate produced from Santa Fe Springs crude oil is taken from tank 30 via line 31 controlled by valve 31' and pump 32 which forces the oil into line 33 where it meets a stream of liquefied normally gaseous hydrocarbon solvent, preferably commercial liquid propane, under a pressure of, say, 165 lbs. gauge or under pressure sufficient to maintain the solvent in the liquid state. The liquid propane is withdrawn from tank 34 via line 35 controlled by valve 36 and pump 37 which forces the liquid propane through line 38 into line 33. While I prefer to use commercial propane as a combined diluent and refrigerant, it will be observed that other normally gaseous hydrocarbons such as butane, iso-butane, butylene, ethane, ethylene, propane, propylene and the like may be used either separately or in admixture with each other.

The waxy oil and liquid propane brought together by means of separate pumps are passed through mixer 39 and then through heat exchanger 40 where the solution is cooled down to a temperature which is definitely above the temperature of the initial separation of wax although preferably the temperature may be reduced to approximately a few degrees above the cloud point of the oil-diluent mixture. The combined stream of oil and propane is then led via line 41 controlled by valve 42 into chiller 43. In chiller 43, the temperature of the mixture is gradually reduced to approximately −40° F. by gradually vaporizing a portion of propane under reduced pressure. Pressure is controlled by valve 45 on line 44 and compressor 47. By opening valve 45 on line 44, vaporized propane is passed through line 44 into line 46 to the suction of compressor 47 where the propane is compressed and is passed through line 48 to cooler 49 where the propane is liquefied and then runs down through line 50 into propane storage tank 34.

The chilled oil and remaining propane solution containing the precipitated wax at −40° F., preferably in the ratio of approximately 3½ to 4 volumes of propane to one of the oil and wax, is withdrawn from the bottom of chiller 43 via line 51 and pumped under pressure by pump 52 through line 8, valve 9, sprayhead or spider 10 into filter chamber 1. The solution of oil and propane and precipitated wax will completely fill the chamber after which further introduction of chilled mixture under pressure will force propane and oil though the filter elements or canvas cloths 19, through the finer screens 18, into the space between the finer screens. The filtrate then trickles down the coarser screens 17 into filtrate collectors 22, through openings 25 and is then forced up through the vertical pipe 26, to discharge pipe 5 and manifold 7 provided with valve 53 from which it passes via line 54 and valve 55 to filtrate surge tank 56. The filtrate may be withdrawn as desired via line 58 controlled by valve 58′ and pump 59 which forces the filtrate through line 60, heater 61 into evaporator 62 in which vaporized propane is withdrawn via line 63 controlled by valve 64 and passed into line 46 to compressor 47. Steam circulating through closed coil 65 aids in vaporizing the propane from the oil. The depropanized oil is withdrawn from the bottom of evaporator 62 via line 66 controlled by valve 67 by pump 68 which forces the dewaxed oil into storage tank 69. During filtration valves 12 and 15 are closed and valve 9 opened to permit introduction of chilled oil, propane and precipitated wax into the filter chamber.

The filtration of the chilled mixture is continued until a wax cake of about one-half inch to one inch thick is built on the filter leaves at which time the flow of chilled mixture containing the precipitated wax is stopped by closing the inlet valve 9 on line 8 and opening drain valve 15 on line 14. The propane-wax lubricating oil wax is withdrawn from the filter via line 14 and valve 15 by gear pump 70 aided by approximately 10 lbs. propane-gas pressure which is necessary in the filter shell in order to hold the pressure differential between the outside and inside of the filter leaves to prevent the wax from sloughing off the leaves. This gas pressure may be introduced into the filter via line 11 and valve 12. The propane gas and filtrate forced through the filter leaves pass via line 7 and valve 53 to either filtrate surge tank 56 or the cold-mix tank 73 via either valve 55 on line 54 or valve 81 on line 80 depending upon whether the filtrate is waxy or clear. If the filtrate is clear it is passed to filtrate surge tank 56 through valve 55, valve 81 being closed. When waxy or cloudy filtrate appears, valve 55 is closed and valve 81 is opened allowing the waxy filtrate to pass to the cold-mix tank 73. The propane-lubricating oil mix drained from the filter shell is passed via line 14 controlled by valve 15 and gear pump 70 which forces the mixture through line 71 controlled by valve 72 to cold-mix tank 73. The propane-lubricating oil mix in tank 73 may be returned to the filter at the resumption of the filtering operation via line 74 controlled by valve 75 and pump 76 which forces the mixture through line 77 into line 8. Line 78 controlled by valve 79 positioned at the top of the cold-mix tank permits propane to vaporize and maintain the dewaxing temperature of −40° in the cold-mix tank. Vaporized propane passing through line 78 is passed into line 46.

When the propane-waxy lubricating oil mix has been drained out of the filter, valve 15 is then closed and valve 12 on line 11 is left open to permit propane gas to be introduced into the filter 1. Propane gas is then blown via line 11 through the waxcake at a pressure of approximately 10 to 20 lbs. per quare inch and the blowing is continued for approximately one or two minutes. This operation will partially dry the wax cake, that is, it will remove part of the propane and oil contained in the wax cake. The pressure is then gradually raised by operation of valve 12 until a pressure of about 100 lbs. per square inch is reached on the filter shell. The blowing is continued at this pressure for the length of time necessary to give the maximum degree of washing. As stated previously, the washing will be effected by condensation of propane on the wax cake due to the high gas pressure existing in the chamber and the low temperature of the wax cake. The blowing with propane gas at the high pressure is usually continued for about 10 to 15 minutes. Any filtrate passed through the filter leaves resulting by the blowing operation will collect in filtrate collector 22 and will be removed via line 26, 5, manifold 7 and will pass either via line 54 into filtrate surge tank 56 if clear or via valve 81 to the cold mix tank 73 if cloudy or waxy. Propane gas will also pass to whichever tank is connected with the filter discharge. Propane gas is removed from the filtrate surge tank via line 57 controlled by valve 57′ or from cold-mix tank 73 via line 78 controlled by valve 79 depending upon which tank is connected to the filtrate discharge. The propane gas passes into line 46 to the compressor 47.

As an important feature of the invention, it will be observed that during the blowing operation with propane-gas, the condensed propane passing through the filter cake carrying oil washed from the wax cake in the leaves will pass into the low pressure side of the filter leaf which is maintained at atmospheric pressure by the opening of valves 53 and 81 so that a portion of the propane condensed will revaporize and cause chilling of the wax cake, that is, as the propane condensed on the surface of the wax cake at high pressure is forced through the wax cake, it passes into a region of gradually reduced pressure due to the fact that valve 53 is maintained wide open or open to the atmospheric pressure or to vacuum. Therefore, in passing through the wax cake, condensed propane is revaporized and this revaporization effects a reduction in temperature so the reduction in temperature counterbalances the effect of heating by latent heat of condensation of the condensing propane on the wax cake at the high presure and low temperature existing at the wax cake on the filter leaves. In this manner the wax cake is maintained at a low temperature of, say, −40° F. so that appreciable quantities of the wax cake will not dissolve from the wax cake into the wash propane. If desired, a superatmospheric pressure may be maintained in the interior of the filter leaves during the blowing operation by controlling valve 53. However, this pressure must not be sufficiently high to prevent propane from revaporizing as it passes through the wax cake.

Upon completion of the blowing operation the flow of propane gas through line 11 is discontinued by closing valve 12. Drain valve 15 and valve 7 are opened. Valves 55 and 80 are closed. The wax cake is then removed from the filter leaves. In order to accomplish this a reversed flow of propane gas may be resorted to. This is accomplished by means of a 3-way valve 83 on line 82. The 3-way valve is connected on one side to propane-gas pressure and on the other side by line 84 to vacuum which may comprise the suction of compressor 47 operating through lines 46 and 84. Propane-gas pressure and vacuum are then alternately exerted on the interior of the filter leaves operating through manifold 7, lines 5, pipes 26, filtrate collectors 22, openings 25 and up through coarse screen 17 through finer screen 18 and to the canvas cloths 19. The application of pressure bulges the filter elements and the turning of the 3-way cock to vacuum draws or contracts the canvas cloths. The alternate bulging and contraction or flapping of the canvas cloths dislodges the wax cake from the filter cloths and the dislodged wax will drop to the bottom of the filter chamber from which it may be removed through valve 15.

The wax sloughed off the filtering elements is withdrawn from the filter chamber via line 14 and valve 15 and gear pump 70 which passes the wax through line 85 controlled by valve 86 into the wax surge tank 87, valve 72 being closed. The wax is withdrawn from tank 85 via line 88 controlled by valve 89 by gear pump 90 which forces the wax through line 91, heater 92 into vaporizer 93 where the vaporized propane contained in the wax is withdrawn via line 94 controlled by valve 95 and passed into line 46. Steam circulated through closed coil 93' aids in vaporizing propane from the wax. The depropanized wax is passed from the bottom of the vaporizer via line 96 controlled by valve 97 and pumped by pump 98 into wax storage tank 99 where it is maintained melted by steam circulated through closed coil 100. Following the above operations the filter is ready for repetition of the filter cycle.

However, quite often all of the filter cake washed will not drop to the bottom of the filter shell during the flapping operations. An accumulation of the wax cake is quite often jammed at the bottom of the filter leaves between adjacent filtering elements due to the close spacing of the filter leaves and closes off part of the filter surface for the next run. Furthermore, in some instances the wax cakes between adjacent filtering elements bridge over so that it is difficult to remove the wax cake off the filtering elements by flapping of the leaves. This condition, of course, would hamper subsequent filtration of further quantities of chilled propane oil carrying precipitated wax introduced into the filter. In order to obviate this condition, I have provided means for washing the accumulated wax jammed between the filtering elements. This is accomplished by positioning the openings 10a of the spray head 10 directly over the spaces between filter leaves. In this manner when the filtering operation is resumed and filling of the filter shell is started the mixture of chilled propane, oil and precipitated wax will wash down between the filtering elements and effectively wash the wax off the leaves to the bottom of the shell.

While I have described a preferred embodiment of my invention, it will be understood that this description is not to be considered as limiting as many variations may be made by those skilled in the art without departing from the spirit of my invention. For example, the invention is not to be construed as limiting an operation in a filter since it is obvious to those skilled in the art that the oil contained in the wax separated from chilled solutions containing precipitated wax by such means as settling or centrifuging may likewise be separated by blowing with gas at gradually increasing pressures as described above. Furthermore, it will be observed that condensable hydrocarbon or non-hydrocarbon gases, other than propane, may be employed for the blowing operation, such as, for example, butane, isobutane, butylene, ethane, ethylene, propylene, carbon dioxide, sulfur dioxide, methyl chloride, etc.

I claim:

1. A process for separating oil from wax-oil mixtures which comprises passing a condensable gas which gas in the liquid state will dissolve oil, through said wax-oil mixture under low pressure to separate a portion of the oil from said mixture and then gradually increasing the pressure of said gas to obtain a partial condensation of said gas on said oil-wax mixture whereby a washing of said wax-oil mixture is obtained.

2. A process as in claim 1 in which the condensable gas is a hydrocarbon.

3. A process as in claim 1 in which the condensable gas is propane.

4. A process for separating oil from wax-oil mixtures which comprises passing a condensable gas which gas in the liquid state will dissolve oil, through said wax-oil mixture under a pressure of approximately 10 to 20 lbs., flowing said wax-oil mixture with said gas under said pressure to remove a portion of the oil contained in said wax-oil mixture and gradually increasing the pressure of said blowing to approximately 50 to 100 lbs. per square inch to obtain a partial condensation of said gas on the remaining wax-oil mixture whereby said wax-oil mixture is simultaneously blown and partially washed to separate further quantities of oil from said wax-oil mixture.

5. In a process for separating wax from oils containing the same comprising diluting the wax containing oil with a diluent, chilling the mixture to precipitate wax and then passing the chilled mixture into a filter to separate precipitated wax from the oil and diluent, the steps of blowing a hydrocarbon gas through the precipitated wax accumulating on the filter under gradually increasing pressure.

6. A process for separating wax from oils containing the same which comprises commingling said oil with a liquefied normally gaseous hydrocarbon solvent, chilling said mixture to precipitate wax, passing said mixture through a filter to separate the precipitated wax from the oil and solvent and to leave wax cakes on the leaves of said filter, draining said filter of unfiltered mixture and then blowing the wax cakes in said filter with a condensable hydrocarbon gas at a pressure commencing with 10 to 20 lbs. per square inch and gradually increased to pressures of 50 to 100 lbs. per square inch whereby said wax cakes are partially dried of oil by blowing at the lower pressure and the wax cakes are partially washed of oil by condensation of gas on the wax cake at said higher pressures.

7. A process as in claim 6 in which the hydrocarbon gas is propane.

8. A process as in claim 6 in which the treated wax cakes are separated from the filter.

9. A process as in claim 6 in which the wax cakes are separated from the filter by washing the filter with a mixture of chilled oil solvent solution containing precipitated wax introduced into the spaces between the filter leaves.

10. In a process for separating oil from wax-oil mixtures, the steps of passing a condensable gas which gas in the liquid state will dissolve oil, through said wax-oil mixture under pressure sufficient to condense a portion of said gas on said wax-oil mixture and revaporizing a portion of said condensed gas on said wax-oil mixture under low pressure to maintain said wax-oil mixture at low temperature.

11. A process as in claim 10 in which the condensable gas comprises a hydrocarbon.

BASIL HOPPER.